(12) United States Patent
Tsunekawa

(10) Patent No.: US 6,396,541 B1
(45) Date of Patent: *May 28, 2002

(54) VIDEO CAMERA HAVING AN EJECT MECHANISM

(75) Inventor: Michihiko Tsunekawa, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/638,707

(22) Filed: Aug. 14, 2000

Related U.S. Application Data

(63) Continuation of application No. 08/937,277, filed on Sep. 15, 1997, now Pat. No. 6,169,579, which is a continuation of application No. 08/563,562, filed on Nov. 28, 1995, now abandoned, which is a continuation of application No. 08/271,572, filed on Jul. 7, 1994, now abandoned, which is a continuation of application No. 07/910,655, filed on Jul. 8, 1992, now abandoned.

(30) Foreign Application Priority Data

Jul. 24, 1991 (JP) ............................................. 3-184638

(51) Int. Cl.$^7$ ............................................. H04N 5/225
(52) U.S. Cl. ...................................... 348/373; 348/207
(58) Field of Search .................................. 348/207, 220, 348/231, 232, 233, 373, 374, 375, 376; 358/906; 386/117, 118; 360/99.02, 99.03, 99.06, 99.07, 96.1, 105; 369/77.2; 242/338, 339; H04N 5/225

(56) References Cited

U.S. PATENT DOCUMENTS 3,724,858 A * 4/1973 Matin ........................ 360/96.1
4,764,821 A * 8/1988 Aoki et al. .................... 386/83
4,829,383 A * 5/1989 Harase et al. ................ 348/373
4,829,384 A * 5/1989 Iida et al. .................... 348/373
5,034,824 A * 7/1991 Morisawa et al. ........... 348/373
5,130,804 A * 7/1992 Tamura et al. ............... 348/231
5,159,458 A * 10/1992 Murata et al. ............... 348/233
5,355,357 A * 10/1994 Yamamori et al. .......... 369/77.2
5,469,271 A * 11/1995 Hoshino et al. ............. 348/375

FOREIGN PATENT DOCUMENTS

JP          1-117475 A   *  5/1989   ............ H04N/5/225
JP          3-1767 A     *  1/1991   ............ H04N/5/225
JP          3-68278 A    *  3/1991   ............ H04N/5/225

* cited by examiner

Primary Examiner—Tuan Ho
(74) Attorney, Agent, or Firm—Robin, Blecker & Daley

(57) ABSTRACT

A video camera includes a camera body, a holder arranged to house and hold a tape-shaped recording medium within the camera body, to have an eject part for ejecting the recording medium and to be movable between a first position in which the recording medium can be pulled out and a second position in which the recording medium can be inserted or ejected, a cover arranged to be lockable in a state of covering the eject part of the holder, an eject switch arranged to input an ejecting instruction, and a lock part arranged to hold the holder in the first position. The cover is in the state of covering the eject part of the holder before the ejecting instruction is input to the eject switch. After the ejecting instruction is input, the cover moves to uncover the eject part of the holder and, at the same time, the holder moves from the first position to the second position.

29 Claims, 4 Drawing Sheets

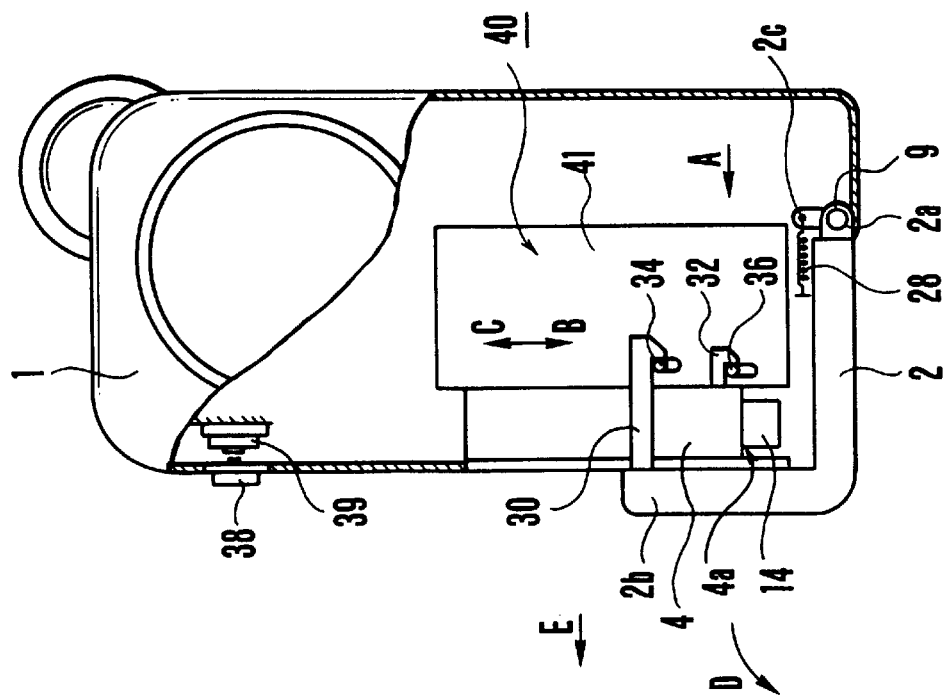
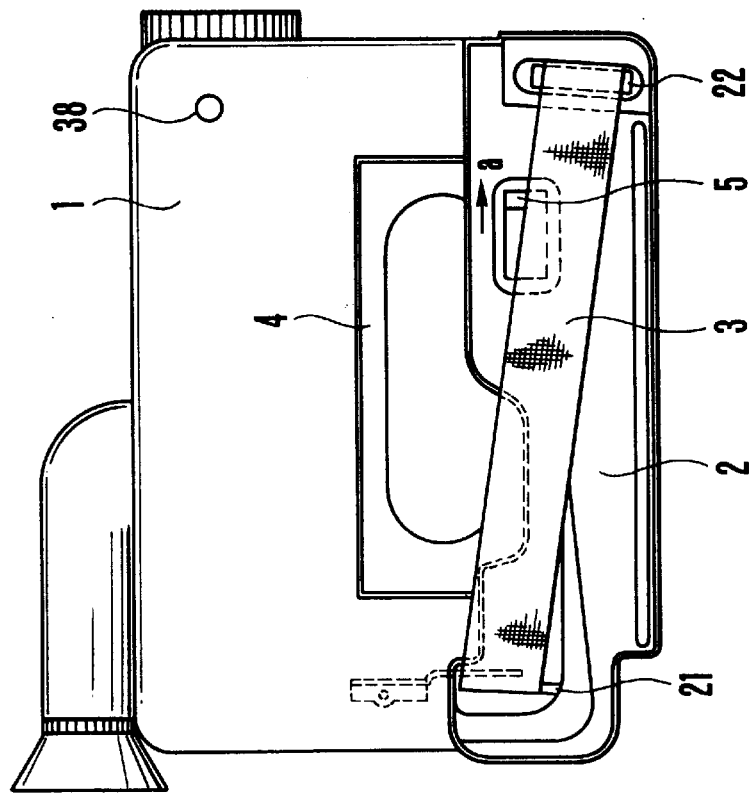

VIDEO CAMERA HAVING AN EJECT MECHANISM

CROSS-REFERENCE TO RELATED APPLICATIONS

This application is a continuation of application Ser. No. 08/937,277, filed Sep. 15, 1997, U.S. Pat. No. 6,169,579, which is a continuation of Ser. No. 08/563,562, filed Nov. 28, 1995 (abandoned), which is a continuation of Ser. No. 08/271,572, (abandoned) filed Jul. 7, 1994, which is a continuation of Ser. No. 07/910,655, filed Jul. 8, 1992, (abandoned).

BACKGROUND OF THE INVENTION

1. Field of the Invention

This invention relates to a video camera having an eject mechanism for ejecting a recording medium which is used for recording information obtained by shooting.

2. Description of the Related Art

The camera-integrated type video tape recorders (hereinafter referred to as VTRS) have been known as a kind of video cameras. The reduction in size and weight of the camera-integrated type VTRs has remarkably been achieved of late. The popularization of the VTRs of this kind has been furthered partly by such a reduction.

Some of the compact, light-weight camera-integrated type VTRs is provided with a cover for protecting a holder which is arranged to hold a cassette tape serving as a recording medium for recording information obtained by shooting. In the case of such a camera-integrated type VTR, the cassette tape begins to be inserted into or ejected from the VTR by unlocking the cover and issuing an ejecting instruction, for example, with an eject switch pushed. Upon the issuance of the ejecting instruction, the cassette tape is unloaded within the VTR. After that, the holder moves to a cassette-inserting-and-ejecting position. Thus, in that position, the cassette tape can be inserted into or ejected from the holder.

However, such being the arrangement, it has been impossible to insert or eject the cassette tape without unlocking the cover, issuing the ejecting instruction, unloading the cassette tape and moving the holder to the cassette-inserting-and-ejecting position.

SUMMARY OF THE INVENTION

In view of the problem mentioned above, it is an object of this invention to provide a video camera having an improved operability for insertion and ejection of a tape cassette into and from the video camera.

To attain this object by solving the problem of the prior art, a video camera arranged according to an embodiment of this invention comprises: a camera body; a holder arranged to house and hold a recording medium within the camera body; a cover arranged to be lockable in a state of covering an eject part of the holder provided for ejecting the recording medium; and ejecting-instruction input means. The cover has a lock part arranged to be lockable, when the cover is in a closed state, to an engaging part which is movably arranged on the camera body. When an ejecting instruction is input to the ejecting-instruction input means, the engaging part moves to unlock the lock part. After that, the holder begins to perform an ejecting action for ejecting the recording medium.

Further, a video camera arranged according to another embodiment of this invention comprises: a camera body; a holder arranged to house and hold a recording medium within the camera body; a cover arranged to be lockable in a state of covering an eject part of the holder provided for ejecting the recording medium; and ejecting-instruction input means arranged to input an ejecting instruction in association with an opening action of the cover.

These and other objects and features of this invention will become apparent from the following detailed description of embodiments thereof taken in connection with the accompanying drawings.

BRIEF DESCRIPTION OF THE DRAWINGS

FIG. 1 is a front view showing the arrangement of a camera-integrated type VTR arranged according to this invention as a first embodiment thereof.

FIG. 2 is a partly sectional view showing in outline the essential parts of the internal mechanism of the VTR body in the first embodiment.

DETAILED DESCRIPTION OF THE PREFERRED EMBODIMENTS

The following describes some of the preferred embodiments of this invention with reference to drawings:

First Embodiment

Figure 3:
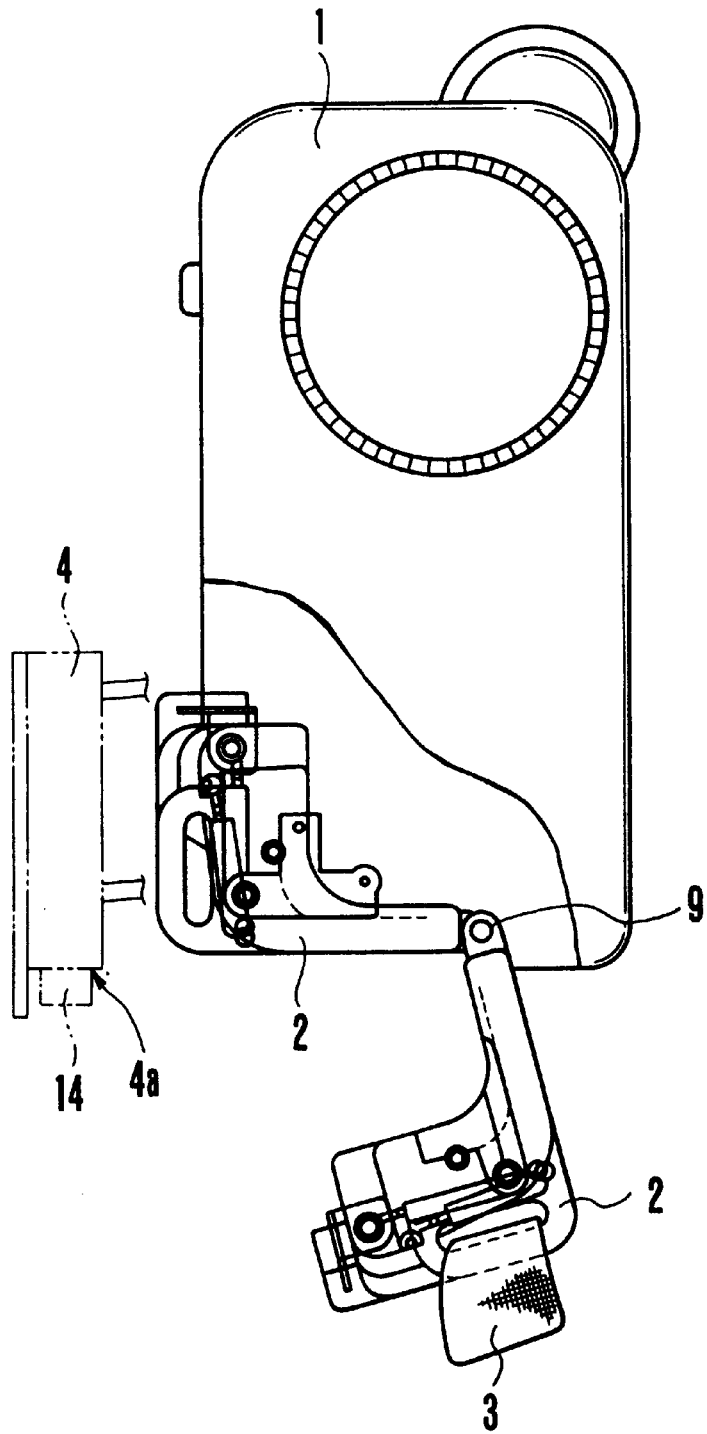
FIG. 3 is a right side view showing the action of a cover in the first embodiment.

FIGS. 1 to 3 show the arrangement of a camera-integrated type VTR arranged as a first embodiment of this invention, in which: FIG. 1 is a front view of the VTR body; FIG. 2 is a partly sectional view showing in outline the essential parts of the internal mechanism of the VTR body; and FIG. 3 is a right side view showing the action of a cover. It should be noted that in FIG. 1, an unlocking knob 5, etc., to be used for a second embodiment which will be described later are also shown for the sake of illustrating both the first and second embodiments.

Referring to FIG. 1, the camera-integrated type VTR has a body 1. A cassette holder 4 is arranged to house and hold, within the body 1, a tape cassette (hereinafter referred to as the cassette) 14 (see FIG. 3). The cassette holder 4 has an eject part 4a provided for ejecting the cassette 14. A cover 2 which is swingably placed at the lower part of the VTR body 1 is arranged to cover the eject part 4a and to protect the cassette holder 4. A belt 3 for applying the back of the hand is attached to hooks 21 and 22 formed on the cover 2. The eject part 4a of the cassette holder 4 is arranged to be in such a form that the cassette 14 can be inserted and ejected at the bottom of the body 1.

In shooting with the above-stated camera-integrated type VTR, the body 1 is held in such a way that the upper part of the body 1 is held by fingers with the palm of the hand inserted between the cover 2 and the back-applying belt 3 while the lower part of the palm of the hand is kept in touch with the cover 2. With the body 1 held in this manner, both the cover 2 and the upper part of the body 1 are held by the hand. Therefore, no external force is applied directly to the cassette holder 4.

Referring to FIG. 2, an automatic ejecting mechanism in this embodiment is described as follows: One end part 2a of the cover 2 is pivotally carried by the body 1 via a rotation shaft 9. A spring peg part 2c is formed to protrude from the end part 2a. A spring 28 which is attached to the spring peg part 2a is arranged to urge the cover 2 to move in the direction of arrow A. Meanwhile, an engaging lever 30 is formed at the other end 2b of the cover 2. The engaging lever 30 is arranged to penetrate one side of a chassis 41 which has a VTR mechanism part 40 disposed therein and to be locked to a first engaging pin 34, which is mounted to be movable in the directions of arrows B and C. An engaging lever 32 which is formed on the cassette holder 4 is likewise arranged to penetrate one side of the chassis 41 and to be locked to a second engaging pin 36, which is mounted to be movable also in the directions of arrows B and C. Reference numeral 38 denotes an eject button. An eject switch 39 which is composed of, for example, a tactile switch or the like is arranged to be operable by pushing the eject button 38.

An ejecting action is described as follows: When the eject switch 39 turns on with the eject button 38 pushed, the ejecting action begins.

The tape which is contained within the cassette 14 is first unloaded by the VTR mechanism part 40. Upon completion of the unloading action, the first engaging pin 34 moves in the direction of arrow B to disengage and unlock the engaging lever 30 from the first engaging pin 34. With the engaging lever 30 unlocked, the urging force of the spring 28 causes the cover 2 to turn in the direction of arrow D.

After that, the second engaging pin 36 moves in the direction of arrow B to disengage and unlock the engaging lever 32 from the second engaging pin 36. The cassette holder 4 then moves in the direction of arrow E to come to a position where the cassette 14 can be ejected, as shown in FIG. 3. The ejecting action thus comes to an end. If the cassette 14 has not been inserted, the cassette 14 can be inserted with the cassette holder 4 in this position. Further, in the case of this embodiment, the cover 2 is arranged to turn in the direction of arrow D (in the direction of opening) by the urging force of the spring 28. Therefore, the second engaging pin 36 is allowed to move in a state of having the cover 2 opened without fail. However, the possibility of any accidental malfunction can be prevented by arranging a position sensor and by allowing the second engaging pin 36 to move after the detection of the open state of the cover 2.

In shooting, the cassette 14 is inserted into the cassette holder 4 which is in an ejection-completed position. The cassette holder 4 is then caused to move in the direction opposite to the direction of arrow E shown in FIG. 2. At this time, the engaging pin 36 has already been moved in the direction of arrow C and set in its initial position, so that the engaging lever 32 is locked to the engaging pin 36. After that, the engaging pin 34 is caused to move in the direction of arrow C to be set in its initial position. Then, the cover 2 is caused to turn in the direction opposite to the direction of arrow D. As a result, the engaging lever 30 is locked to the engaging pin 34. Under this condition, the tape contained within the cassette 14 is loaded to permit shooting.

As apparent from the description given above, in the case of this embodiment, when an ejecting instruction is supplied to the ejecting-instruction input means, the engaging part moves to unlock the lock part of the cover from the engaging part. The recording-medium holder is allowed to start its ejecting action after the lock part is unlocked. By virtue of this arrangement, the cover can be automatically unlocked, without recourse to any manual unlocking operation, before commencement of the ejecting action. The operability of the VTR for loading and unloading the tape cassette thus can be greatly improved. Further, since the cover is urged by the urging force of the spring to move in the opening direction, the cover smoothly opens after the automatic unlocking action.

Second Embodiment

Figure 4:
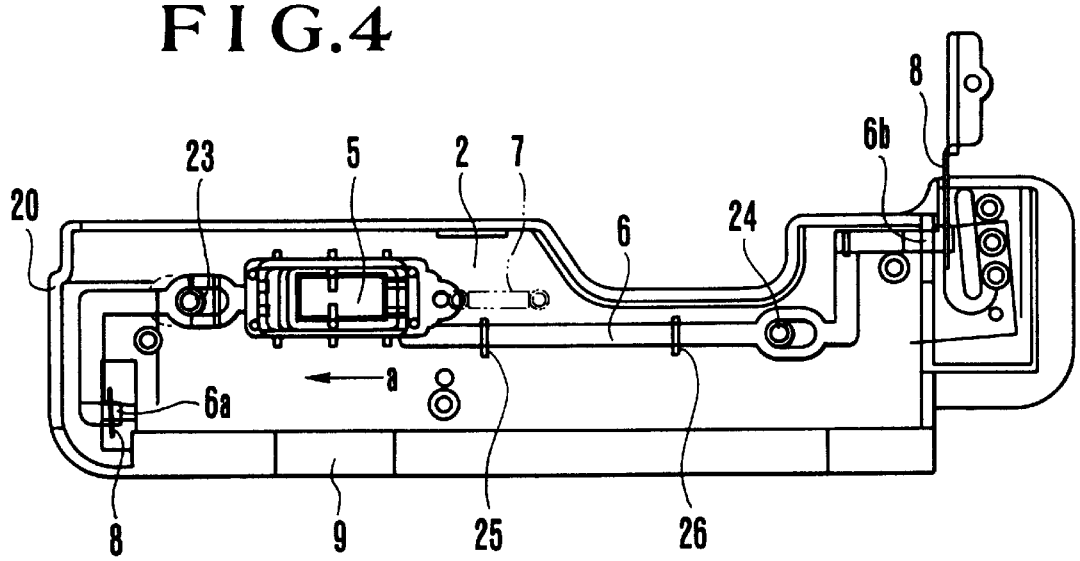
FIG. 4 is a view showing the mechanism of a cover in a second embodiment of this invention.
Figure 5:
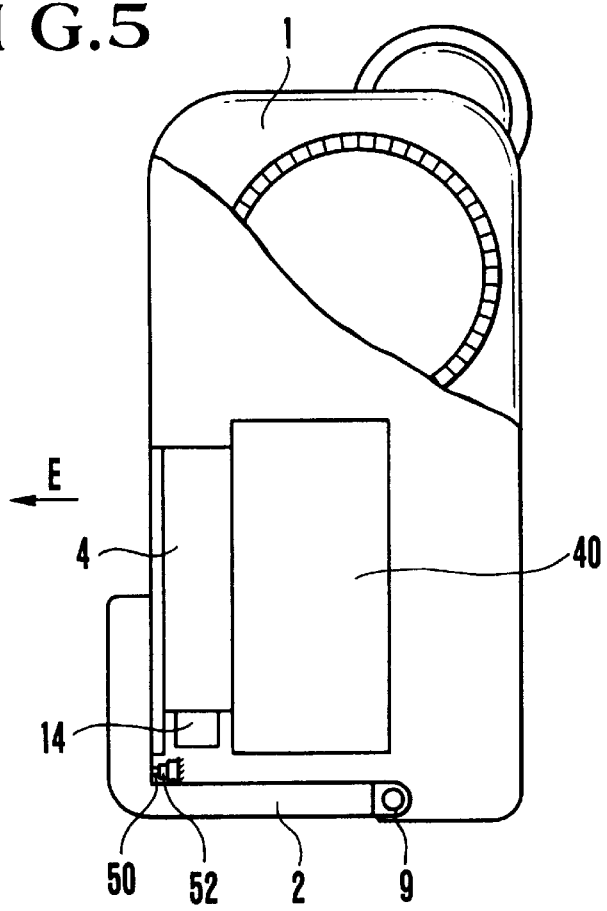
FIG. 5 is a partly sectional view showing in outline the essential parts of the internal mechanism of the VTR body in the second embodiment.

A second embodiment of this invention differs from the first embodiment in the following point: The first embodiment is arranged to have the tape cassette automatically ejected when the eject button 38 is pushed. In the case of the second embodiment, the automatic ejecting action is arranged to begin in association with a manual operation for opening the cover 2. FIGS. 4 and 5 show the second embodiment. In these figures, component parts acting in the same manner as those of the first embodiment are indicated by the same reference numerals.

The arrangement of the cover 2 is described first with reference to FIG. 4. FIG. 4 shows the cover 2 as viewed from the reverse side of the cover 2 shown in FIG. 1. An unlocking knob 5 is arranged to be moved in the direction of arrow "a" so as to unlock the cover 2. A lock member 6 is connected to the unlocking knob 5 and is arranged to be guided by engaging-projection parts 23 and 24 and engaging-hole parts 25 and 26 formed on the cover 2. The two end parts 6a and 6b of the lock member 6 engage lock members 8 when the cover 2 is in its locked state. The lock member 6 is arranged to disengage from the lock members 8 by moving in the direction of arrow "a" as the unlocking knob 5 moves in the direction of arrow "a". The lock members 8 are arranged in two parts of the body 1 (FIG. 1) so as to engage the two end parts 6a and 6b of the lock member 6 in one and the same direction. A return spring 7 is arranged to exert an urging force on the unlocking knob 5 in the direction opposite to the direction of arrow "a" and to bring the unlocking knob 5 back to its original position from its position taken after the movement in the direction of arrow "a". A rotation shaft 9 is arranged to allow the cover 2 to turn thereon. The rotation shaft 9 is pivotally carried by the body 1 through its recessed parts which are formed at two ends of the shaft 9. The cover 2 is thus carried by the body 1 not only through the rotation shaft 9 but also at its two end parts. The arrangement gives a sufficient engaging strength to ensure that the cover 2 never disengages from the body 1 with the body 1 held in any posture. The cover 2 which is arranged in this manner is provided with a switch pushing part 50 in the case of the second embodiment as shown in FIG. 5. When the cover 2 is in a locked state, the switch pushing part 50 is pushing an eject switch 52 which is provided on the body 1.

In inserting or ejecting the cassette 14 into or from the body 1, the second embodiment operates as follows: As described in the foregoing, the unlocking knob 5 is first moved in the direction of arrow "a", as shown in FIG. 1 or 4, to bring the cover 2 into an unlocked state. In this state, the cover 2 is locked to the VTR body 1 by a known locking mechanism consisting of engaging projection and recessed parts which are not shown. The locked state can be canceled by turning the cover 2 in the direction of arrow D. At this moment, the switch pushing part 50 parts from the eject switch 52. An eject signal is issued by this parting action of the switch pushing part 50. Then, in accordance with the eject signal, the tape contained within the cassette 14 is unloaded and, after that, the cassette holder 4 moves in the direction of arrow E (FIG. 5) in the same manner as in the case of the first embodiment. The state of the embodiment then becomes as shown in FIG. 3, so that the cassette 14 can be inserted or removed into or from the cassette holder 4. With the cassette 14 thus inserted into the cassette holder 4, the above-stated action is reversely performed to bring the cover 2 into a locked state. Under that condition, the switch pushing member 50 pushes the eject switch 52 to load the tape of the cassette 14 and to bring it into a normal usable state.

Third Embodiment

Figure 6A:
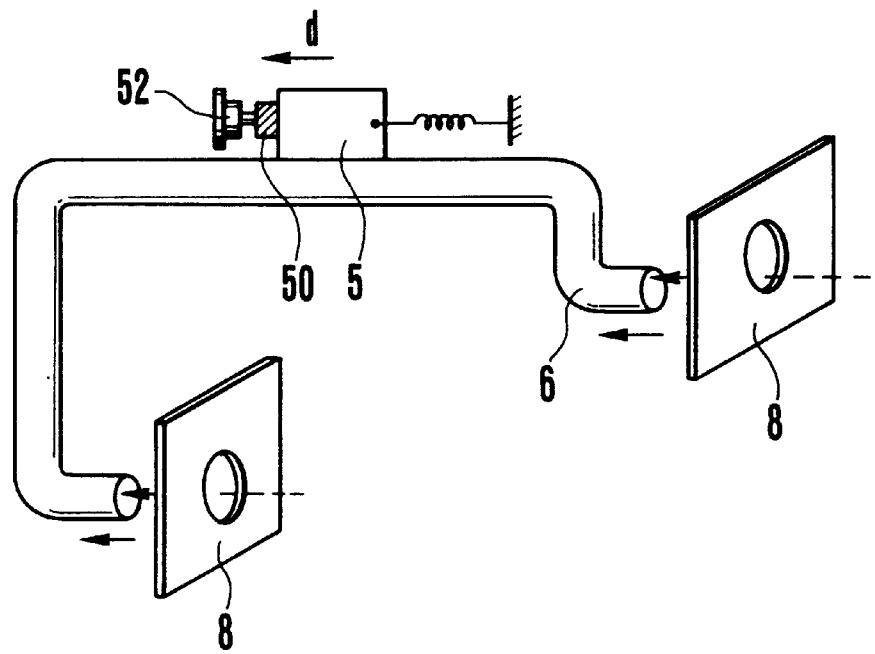
FIGS. 6(a) and 6(b) are schematic illustrations showing different manners in which a third embodiment of this invention is arranged.

The second embodiment is provided with the switch for performing the ejecting action in association with the opening action of the cover 2. In the case of a third embodiment of the invention, the ejecting action is arranged to be performed with an eject switch mechanism disposed between the body 1 and the unlocking knob 5 of the cover 2 or the lock member 6. The third embodiment is described below with reference to FIGS. 6(a) and 6(b):

FIG. 6(a) shows a case where a switch pushing part 50 is attached to the unlocking knob 5 while an eject switch 52 is disposed on the side of the body 1. With the VTR arranged in this manner, the cover 2 is unlocked as the unlocking knob 5 is moved in the direction of arrow "d". At the same time, the switch pushing part 50 pushes the eject switch 52 to cause the ejecting action to begin. At that moment, the cover 2 has not begun to open as yet. Therefore, it is necessary to set some delay time before the start of the ejecting action.

Figure 6B:
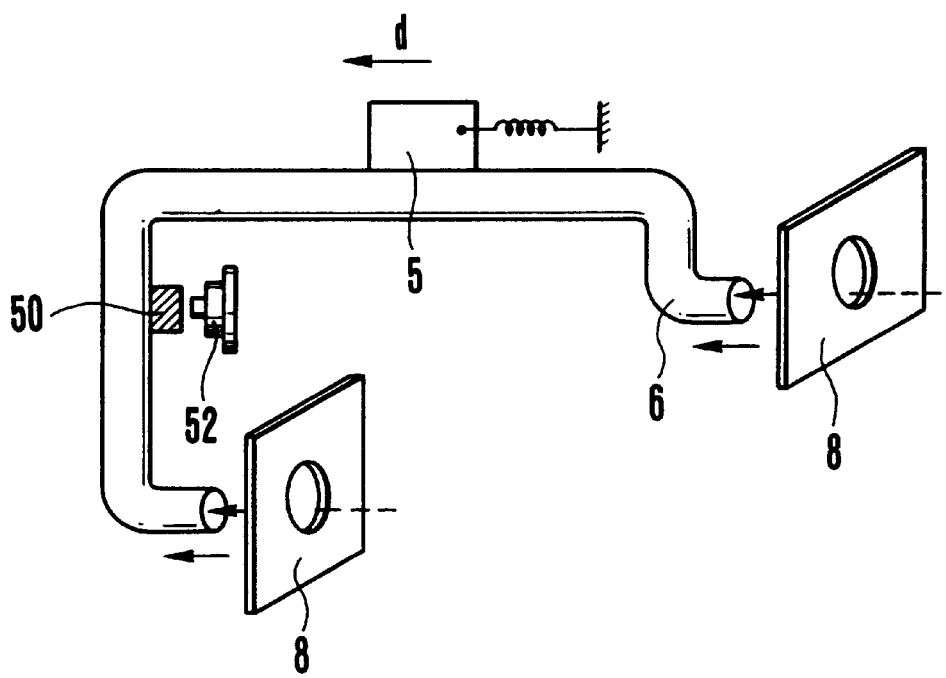

FIG. 6(b) shows another case where the switch pushing part 50 is attached to the lock member 6 while the eject switch 52 is disposed on the side of the body 1. With the VTR arranged in that manner, the lock member 6 which is connected to the unlocking knob 5 moves in the direction of arrow "d" as the unlocking knob 5 is moved in the direction of arrow "d". This movement of the lock member 6 unlocks the cover 2 and also causes the switch pushing part 50 to part from the eject switch 52. Then, a signal which is of the polarity opposite to that of a signal obtained by the arrangement shown in FIG. 6(a) is sent out for commencement of the ejecting action.

In each of these embodiments described above, the switch pushing part 50 is disposed on the side of the moving part. However, this arrangement may be changed to have the switch pushing part 50 disposed on the side of the stationary part (the body 1).

In the case of the third embodiment, an ejecting instruction is arranged to be input to the ejecting-instruction input means in association with an opening action of the cover. Therefore, the ejecting action can be caused to begin by just opening the cover without recourse to any additional ejecting instruction. In accordance with the arrangement of the third embodiment, therefore, the operability of the VTR thus can be also greatly improved for insertion and ejection of the tape cassette like in the cases of other embodiments described.

What is claimed is:

1. A recording and/or reproducing apparatus comprising:
   a) a holder for housing and holding a cassette within said apparatus, said holder having an opening part for ejecting the cassette and being arranged to be movable between a first position in which a tape can be pulled from the cassette and a second position in which the cassette can be inserted or ejected through the opening part;
   b) a cover provided separately from said holder and arranged to be lockable in a state of covering the opening pan of said holder;
   c) ejecting instruction means for generating an ejecting instruction which makes said holder move from the first position to the second position; and
   d) a lock part for holding said cover in the state of covering the opening part of said holder and releasing said cover in response to the ejecting instruction output from said ejecting instruction means, so as to uncover the opening part of said holder and move said holder from the first to the second position.

2. An apparatus according to claim 1, wherein said lock part comprising a first engaging member arranged on said cover and a second engaging member movably arranged on an apparatus body, wherein said first engaging member is locked to said second engaging member when said cover is in a closed state, and said second engaging member moves to unlock said first engaging member in response to said ejecting instruction.

3. An apparatus according to claim 1, wherein said lock part comprising a first engaging member movably arranged on said cover and a second engaging member arranged on an apparatus body, wherein said first engaging member is locked to said second engaging member when said cover is in a closed state, and said first engaging member moves to unlock said second engaging member in response to said ejecting instruction.

4. An apparatus according to claim 1, wherein said ejecting instruction means includes an eject switch for outputting an ejecting instruction signal, wherein said eject switch is further outputting an opening instruction which makes said lock part release from holding said cover.

5. An apparatus according to claim 4, wherein said ejecting instruction means further includes an operating member arranged on an apparatus body for operating said eject switch.

6. An apparatus according to claim 4, wherein said lock part comprising a first engaging member arranged on said cover and a second engaging member movably arranged on an apparatus body, wherein said first engaging member is locked to said second engaging member when said cover is in a closed state, and said second engaging member moves to unlock said first engaging member in response to said opening instruction.

7. An apparatus according to claim 1, wherein said ejecting instruction means includes an eject switch for outputting an ejecting instruction signal and an operating member for operating the eject switch, wherein said operating member arranged to be capable of releasing said lock part from holding said cover.

8. An apparatus according to claim 7, wherein said lock part comprising a first engaging member movably with said operating member arranged on said cover and a second engaging member arranged on an apparatus body, wherein said first engaging member is locked to said second engaging member when said cover is in a closed state, and said first engaging member moves to unlock said second engaging member in response to an operation of said operating member.

9. An apparatus according to claim 1, wherein said cover is arranged to be turnable on an apparatus body.

10. An apparatus according to claim 1, wherein said cover is urged in a direction of opening said cover.

11. An apparatus according to claim 1, wherein said cover arranged to move to uncover the opening part of said holder, wherein a moving direction of said cover is different from that of said holder from the first position to the second position.

12. An apparatus according to claim 1, wherein said cover covers at least two sides of said apparatus in a closed state.

13. A video camera comprising:
a) a camera body;
b) a holder for housing and holding a recording medium within said camera body, said holder having an opening part for ejecting the recording medium and being arranged to be movable between a first position in which a recording and/or reproducing operation can be performed and a second position in which the recording medium can be inserted or ejected through the opening part;
c) a cover arranged to be lockable in a state of covering the opening part of said holder and to be moveable to uncover the opening part of said holder, wherein a moving direction of said cover is different from that of said holder from the first position to the second position;
d) ejecting instruction means for generating an ejecting instruction which makes said holder move from the first position to the second position; and
e) a lock part for holding said cover in the state of covering the opening part of said holder and releasing said cover in response to the ejecting instruction output from said ejecting instruction means, so as to uncover the opening part of said holder and move said holder from the first position to the second position.

14. A video camera according to claim 13, wherein said lock part comprising a first engaging member arranged on said cover and a second engaging member movably arranged on a camera body, wherein said first engaging member is locked to said second engaging member when said cover is in a closed state, and said second engaging member moves to unlock said first engaging member in response to said ejecting instruction.

15. A video camera according to claim 13, wherein said lock part comprising a first engaging member movably arranged on said cover and a second engaging member arranged on a camera body, wherein said first engaging member is locked to said second engaging member when said cover is in a closed state, and said first engaging member moves to unlock said second engaging member in response to said ejecting instruction.

16. A video camera according to claim 13, wherein said ejecting instruction means includes an eject switch for outputting an ejecting instruction signal, wherein said eject switch is further outputting an opening instruction which makes said lock part release from holding said cover.

17. A video camera according to claim 13, wherein said ejecting instruction means includes an eject switch for outputting an ejecting instruction signal and an operating member for operating the eject switch, wherein said operating member arranged to be capable of releasing said lock part from holding said cover.

18. A video camera according to claim 13, wherein said cover is arranged to be turnable on a camera body.

19. A video camera according to claim 13, wherein said cover covers at least two sides of said camera in a closed state.

20. A recording and/or reproducing apparatus comprising:
a) a holder arranged to house and hold a recording medium within said apparatus and to have an opening part for ejecting the recording medium;
b) an eject switch for outputting an ejecting instruction;
c) ejecting means, in response to the ejecting instruction output by said eject switch, for moving the holder from a first position in which a recording and/or reproducing operation can be performed to a second position in which the recording medium can be inserted or ejected through the opening part;
d) a cover provided separately from said holder and arranged to be lockable in a state of covering the opening part of the holder, wherein said cover has an operating member which is operated in connection with said cover and directly operates said eject switch in response to an opening action of said cover to output the ejecting instruction to said ejecting means; and
e) control means for causing the ejecting means to move the holder from the first position to the second position in response to the operation of the eject switch by the opening action of said cover through the operating member.

21. An apparatus according to claim 20, wherein said operating member mechanically operates said eject switch and said eject switch electrically outputs the ejecting instruction.

22. An apparatus according to claim 26, wherein said cover covers at least two sides of said apparatus in a closed state.

23. An apparatus according to claim 20, wherein said eject switch is disposed in an apparatus body.

24. An apparatus according to claim 20, wherein said eject switch is engaged with said operating member in the state that said cover is locked, and said operating member is released from the engagement with said eject switch in association with the opening action of said cover.

25. An apparatus according to claim 20, wherein said cover arranged to move to uncover the opening part of said holder, wherein a moving direction of said cover is different from that of said holder from the first position to the second position.

26. A recording and/or reproducing apparatus comprising:
a) a holder arranged to house and hold a cassette within said apparatus and to have an opening part for ejecting the cassette;
b) an eject switch for outputting an ejecting instruction;
c) ejecting means, in response to the ejecting instruction output by said eject switch, for moving the holder from a first position in which a tape can be pulled from the cassette to a second position in which the cassette can be inserted or ejected through the opening part;
d) tape loading/unloading means for pulling the tape from the cassette positioned at the first position and loading the tape on a head drum and unloading the tape from the head drum to the cassette;
e) a cover arranged to be lockable in a state of covering the opening part of the holder and to operate said eject switch in response to an opening action of said cover to output the ejecting instruction to said ejecting means; and
f) control means for causing the tape loading/unloading means to perform a tape unloading operation and causing the ejecting means to move the holder from the first position to the second position after a completion of the tape unloading operation in response to the operation of the eject switch by the opening action of said cover through an operating member.

27. An apparatus according to claim 26, wherein said cover mechanically operates said eject switch and said eject switch electrically outputs the ejecting instruction.

28. An apparatus according to claim 26, wherein said cover covers at least two sides of said apparatus in a closed state.

29. An apparatus according to claim 26, wherein said eject switch is disposed in said apparatus.

* * * * *

UNITED STATES PATENT AND TRADEMARK OFFICE
CERTIFICATE OF CORRECTION

PATENT NO.   : 6,396,541 B1
DATED        : May 28, 2002
INVENTOR(S)  : Michihiko Tsunekawa It is certified that error appears in the above-identified patent and that said Letters Patent is hereby corrected as shown below:

Column 1,
Line 23, delete "VTRS" and insert -- VTRs --.

Column 5,
Line 64, delete "pan" and insert -- part --.

Column 8,
Line 17, delete "claim 26" and insert -- claim 20 --.

Signed and Sealed this

Twenty-first Day of October, 2003

JAMES E. ROGAN
*Director of the United States Patent and Trademark Office*